United States Patent
Duluk, Jr. et al.

(10) Patent No.: US 10,133,677 B2
(45) Date of Patent: Nov. 20, 2018

(54) OPPORTUNISTIC MIGRATION OF MEMORY PAGES IN A UNIFIED VIRTUAL MEMORY SYSTEM

(71) Applicant: NVIDIA CORPORATION, Santa Clara, CA (US)

(72) Inventors: Jerome F. Duluk, Jr., Palo Alto, CA (US); Cameron Buschardt, Round Rock, TX (US); James Leroy Deming, Madison, AL (US); Lucien Dunning, Santa Clara, CA (US); Brian Fahs, Los Altos, CA (US); Mark Hairgrove, San Jose, CA (US); John Mashey, Portola Valley, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 92 days.

(21) Appl. No.: 14/133,489

(22) Filed: Dec. 18, 2013

(65) Prior Publication Data

US 2014/0281299 A1    Sep. 18, 2014

Related U.S. Application Data

(60) Provisional application No. 61/783,760, filed on Mar. 14, 2013, provisional application No. 61/800,004, filed on Mar. 15, 2013.

(51) Int. Cl.
| | |
|---|---|
| *G06F 12/12* | (2016.01) |
| *G06F 12/122* | (2016.01) |
| *G06F 12/08* | (2016.01) |
| *G06F 12/1009* | (2016.01) |

(52) U.S. Cl.
CPC .......... *G06F 12/122* (2013.01); *G06F 12/08* (2013.01); *G06F 12/1009* (2013.01); *G06F 2212/251* (2013.01); *G06F 2212/301* (2013.01)

(58) Field of Classification Search
CPC .... G06F 12/122; G06F 12/08; G06F 12/1009; G06F 2212/251; G06F 2212/301
See application file for complete search history.

(56) References Cited

U.S. PATENT DOCUMENTS

| | | | |
|---|---|---|---|
| 2010/0118041 A1* | 5/2010 | Chen et al. | 345/542 |
| 2010/0321397 A1* | 12/2010 | Ginzburg | 345/531 |
| 2011/0072234 A1* | 3/2011 | Chinya et al. | 711/207 |

\* cited by examiner

*Primary Examiner* — Reginald G Bragdon
*Assistant Examiner* — Edward Wang
(74) *Attorney, Agent, or Firm* — Artegis Law Group, LLP

(57) ABSTRACT

Techniques are disclosed for transitioning a memory page between memories in a virtual memory subsystem. A unified virtual memory (UVM) driver detects a page fault in response to a memory access request associated with a first memory page, where a local page table does not include an entry corresponding to a virtual memory address included in the memory access request. The UVM driver, in response to the page fault, executes a page fault sequence. The page fault sequence includes modifying the ownership state associated with the first memory page to be central-processing-unit-shared. The page fault sequence further includes scheduling the first memory page for migration from a system memory associated with a central processing unit (CPU) to a local memory associated with a parallel processing unit (PPU). One advantage of the disclosed approach is that the PPU accesses memory pages with greater efficiency.

27 Claims, 8 Drawing Sheets

OPPORTUNISTIC MIGRATION OF MEMORY PAGES IN A UNIFIED VIRTUAL MEMORY SYSTEM

CROSS-REFERENCE TO RELATED APPLICATIONS

This application claims the priority benefit of United States provisional patent application entitled "OPPORTUNISTIC MIGRATION OF MEMORY PAGES IN A UNIFIED VIRTUAL MEMORY SYSTEM," Ser. No. 61/783,760, filed Mar. 14, 2013. This related application is hereby incorporated herein by reference. This application also claims the priority benefit of United States provisional patent application entitled "CPU-TO-GPU AND GPU-TO-GPU ATOMICS," Ser. No. 61/800,004, filed Mar. 15, 2013. This second related application also is hereby incorporated herein by reference.

BACKGROUND OF THE INVENTION

Field of the Invention

Embodiments of the present invention relate generally to computer science and, more specifically, to opportunistic migration of memory pages in a unified virtual memory system.

Description of the Related Art

Multiprocessor systems typically include a main processor with a system memory that includes data and instructions for the main processor. Portions of this system memory may also be accessible to one or more auxiliary processors, where auxiliary processors may be used to offload certain processing tasks from the main processor. Such a portion of system memory is called a shared memory. The main processor may generate instructions and data directed to an auxiliary processor and store the instructions and data in shared memory. The auxiliary processor may then retrieve the instructions and data from shared memory, perform the operations indicated by the instructions, and store resulting data back to shared memory. The main processor then retrieves the resulting data from the share memory.

One drawback of this approach is that memory access operations generated by the auxiliary processors and directed to shared memory may have relatively high latency, as compared with memory access operations generated by the auxiliary processors that are directed to local memory. As such, the advantage of offloading tasks from the main processor to the auxiliary processor can be reduced.

One possible solution to this drawback is to copy the instructions and data from shared memory into the local memory of the auxiliary processor. The auxiliary processor then retrieves instructions and data from relatively low latency local memory rather than relatively high latency shared memory. One drawback to this type of solution is that the execution of the instructions by the auxiliary processor is delayed until at least some of the shared memory pages that include the needed instructions and data are transferred from the shared memory to the local memory of the auxiliary processor.

Accordingly, what is needed in the art is a more effective way to transition memory pages between different processors in a multi-processor architecture.

SUMMARY OF THE INVENTION

One embodiment of the present invention sets forth a method for transitioning a memory page between memories in a virtual memory subsystem. The memories are attached to different types of processors sharing a common virtual memory space, but having separate page tables. The method includes detecting a page fault in response to a memory access request associated with a first memory page, where a local page table does not include an entry corresponding to a virtual memory address included in the memory access request. The method further includes, in response to the page fault, executing a page fault sequence that includes: (1) modifying the ownership state associated with the first memory page to be central-processing-unit-shared; and (2) scheduling the first memory page for migration from a system memory associated with a central processing unit (CPU) to a local memory associated with a parallel processing unit (PPU).

Other embodiments include, without limitation, a computer-readable storage medium including instructions that, when executed by a processing unit, cause the processing unit to perform one or more aspects of the disclosed methods, and a computing device configured to implement one or more aspects of the disclosed methods.

One advantage of the disclosed approach is that the PPU accesses memory pages with greater efficiency. Memory pages that are accessed only occasionally by the PPU or are accessed frequently by the CPU remain in system memory and are identified as CPU-shared. Memory pages that are accessed only frequently by the PPU and accessed infrequently by the CPU are migrated to PPU memory for more efficient access performance from the PPU.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
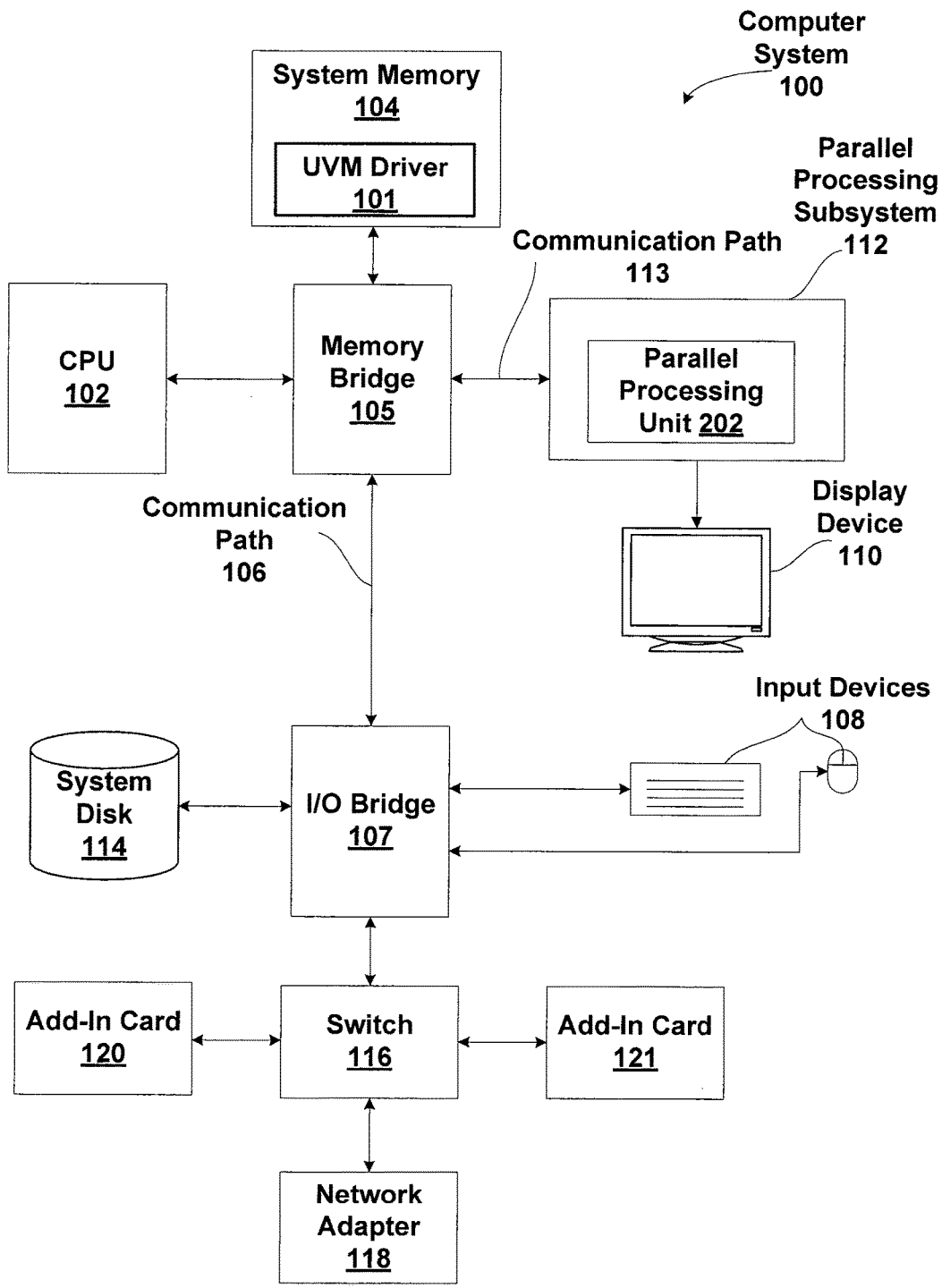
FIG. 1 is a block diagram illustrating a computer system configured to implement one or more aspects of the present invention.

In the following description, numerous specific details are set forth to provide a more thorough understanding of the present invention. However, it will be apparent to one of skill in the art that the present invention may be practiced without one or more of these specific details.

Embodiments of the present invention relate to techniques for opportunistic migration of memory pages in a unified memory system. Among other things, the techniques enable identifying detecting when a parallel processing unit (PPU) accesses a system memory page associated with a central processing unit (CPU), marking the memory page as shared by the PPU and CPU, and scheduling the memory page for later migration to a PPU memory. Multiple pages may be scheduled for later migration, and may be migrated at the same time in a group, thereby increasing efficiency.

As further described below, a central processing unit (CPU) and one or more parallel processing units (PPUs) access a unified memory system, where the CPU and each PPU uses the same virtual address in a virtual address space to access a particular memory location. A physical memory page corresponding to a virtual memory page may reside in either the system memory associated with the CPU or in a PPU memory associated with a PPU. Generally, performance is improved when memory pages accessed frequently by the CPU reside in system memory, while memory pages accessed frequently by the PPU reside in PPU memory.

A memory page residing in system memory may have a corresponding entry in the CPU page table, but not have a corresponding entry in the PPU page table. Such a memory page is considered CPU-owned, in that the CPU may access the memory page without experiencing a page fault. However, when the same memory page is accessed by the PPU, the PPU experiences a page fault. In response to the page fault, the memory page may remain in system memory, but the PPU page table may be updated to include an entry corresponding to the memory page. Such a memory page is considered CPU-shared, in that both the CPU and the PPU may access the memory page without experiencing a page fault. Alternatively, the memory page may be migrated from the system memory to the PPU memory. The entry in the CPU page table corresponding to the memory page is invalidated, and an entry in the PPU page table corresponding to the memory page is created. The PPU memory access is then allowed to complete. Such a memory page is considered PPU-owned, in that the PPU may access the memory page without experiencing a page fault. However, when the same memory page is accessed by the CPU, the CPU experiences a page fault.

PPU accesses to a CPU-shared memory page residing in system memory are slower than accesses to a PPU-owned memory page. However, migrating a memory page from system memory to PPU memory typically takes much longer than the PPU access time of a CPU-shared memory page. As a result, performance is improved when system memory pages that are accessed by the CPU and occasionally accessed by the PPU are CPU-shared, while system memory pages frequently accessed by the PPU migrate to PPU memory and become PPU-owned. With opportunistic migration, a first PPU access to a CPU-owned memory page results in a page fault. The PPU page table is updated to include an entry corresponding to the faulting memory page, and the memory page becomes CPU-shared. The memory page is scheduled for possible later migration to PPU memory. As a result, the PPU does not wait for the memory page to be migrated before the PPU access successfully completes. The memory page may be migrated to PPU memory at a later time and then becomes PPU-owned.

Heuristics may be used to determine whether the memory page continues to be accessed frequently by the PPU and to migrate the memory page only when the PPU accesses the memory page frequently. The system may wait until multiple memory pages are scheduled for migration, and may migrate the multiple memory pages at the same time in a group. Such an approach may improve performance, where migrating a group of memory pages in a block transfer is faster than migrating multiple individual memory pages. In some cases, a PPU memory page may be larger than a system memory page. For example, a system memory page could be 4 KB while a PPU memory page could be 64 KB. If the PPU frequently accesses multiple system memory pages that map to the same PPU memory page, then all system memory pages that map to the same PPU memory page may be migrated at the same time in a group. Alternatively, if the PPU frequently accesses some system memory pages that map to a given PPU memory page, but only occasionally accesses other system memory pages that map to the same PPU memory page, then some system memory pages may remain in system memory while other system memory pages are migrated to PPU memory.

System Overview

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides nonvolatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes one or more parallel processing units (PPUs) 202. In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC). As is well-known, many graphics processing units (CPUs) are designed to perform parallel operations and computations and, thus, are considered to be a class of parallel processing unit (PPU).

Any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

PPU 202 advantageously implements a highly parallel processing architecture. PPU 202 includes a number of general processing clusters (GPCs). Each GPC is capable of executing a large number (e.g., hundreds or thousands) of threads concurrently, where each thread is an instance of a program. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads. Unlike a SIMD execution regime, where all processing engines typically execute identical instructions, SIMT execution allows different threads to more readily follow divergent execution paths through a given thread program.

GPCs include a number of streaming multiprocessors (SMs), where each SM is configured to process one or more thread groups. The series of instructions transmitted to a particular GPC constitutes a thread, as previously defined herein, and the collection of a certain number of concurrently executing threads across the parallel processing engines within an SM is referred to herein as a "warp" or "thread group." As used herein, a "thread group" refers to a group of threads concurrently executing the same program on different input data, with one thread of the group being assigned to a different processing engine within an SM. Additionally, a plurality of related thread groups may be active (in different phases of execution) at the same time within an SM. This collection of thread groups is referred to herein as a "cooperative thread array" ("CIA") or "thread array."

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

In operation, CPU 102 is the master processor of computer system 100, controlling and coordinating operations of other system components. In particular, CPU 102 issues commands that control the operation of PPUs 202. In one embodiment, communication path 113 is a PCI Express link, in which dedicated lanes are allocated to each PPU 202, as is known in the art. Other communication paths may also be used. PPU 202 advantageously implements a highly parallel processing architecture. A PPU 202 may be provided with any amount of local parallel processing memory (PPU memory).

In some embodiments, system memory 104 includes a unified virtual memory (UVM) driver 101. The UVM driver 101 includes instructions for performing various tasks related to management of a unified virtual memory (UVM) system common to both the CPU 102 and the PPUs 202. Among other things, the architecture enables the CPU 102 and the PPU 202 to access a physical memory location using a common virtual memory address, regardless of whether the physical memory location is within the system memory 104 or memory local to the PPU 202.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Unified Virtual Memory System Architecture

Figure 2:
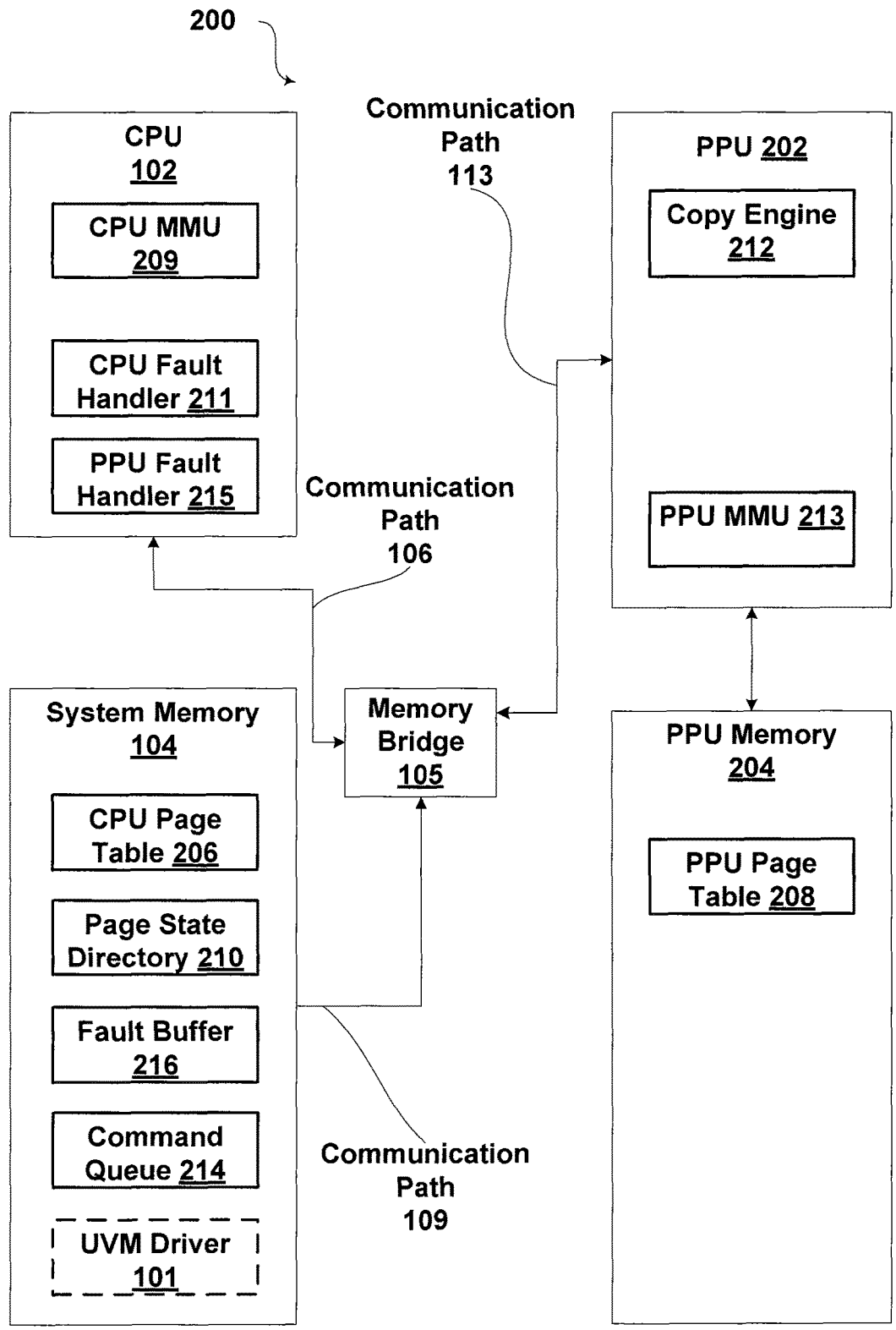
FIG. 2 is a block diagram illustrating a unified virtual memory (UVM) system, according to one embodiment of the present invention.

FIG. 2 is a block diagram illustrating a unified virtual memory (UVM) system 200, according to one embodiment of the present invention. As shown, the unified virtual memory system 200 includes, without limitation, the CPU 102, the system memory 104, and the parallel processing unit (PPU) 202 coupled to a parallel processing unit memory (PPU memory) 204. The CPU 102 and the system memory 104 are coupled to each other and to the PPU 202 via the memory bridge 105.

The CPU 102 executes threads that may request data stored in the system memory 104 or the PPU memory 204 via a virtual memory address. Virtual memory addresses shield threads executing in the CPU 102 from knowledge about the internal workings of a memory system. Thus, a thread may only have knowledge of virtual memory addresses, and may access data by requesting data via a virtual memory address.

The CPU 102 includes a CPU MMU 209, which processes requests from the CPU 102 for translating virtual memory addresses to physical memory addresses. The physical memory addresses are required to access data stored in a physical memory unit such as the system memory 104 and the PPU memory 204. The CPU 102 includes a CPU fault handler 211, which executes steps in response to the CPU MMU 209 generating a page fault, to make requested data available to the CPU 102. The CPU fault handler 211 is generally software that resides in the system memory 104 and executes on the CPU 102, the software being invoked by an interrupt to the CPU 102.

The system memory 104 stores various memory pages (not shown) that include data for use by threads executing on the CPU 102 or the PPU 202. As shown, the system memory 104 stores a CPU page table 206, which includes mappings between virtual memory addresses and physical memory addresses. The system memory 104 also stores a page state directory 210, which acts as a "master page table" for the UVM system 200, as is discussed in greater detail below. The system memory 104 stores a fault buffer 216, which includes entries written by the PPU 202 in order to inform the CPU 102 of a page fault generated by the PPU 202. In some embodiments, the system memory 104 includes the unified virtual memory (UVM) driver 101, which includes instructions that, when executed, cause the CPU 102 to execute commands for, among other things, remedying a page fault. In alternative embodiments, any combination of the page state directory 210, the fault buffer 216, and one or more command queues 214 may be stored in the PPU memory 204. Further, a PPU page table 208 may be stored in the system memory 104.

In a similar manner as with the CPU 102, the PPU 202 executes instructions that may request data stored in the system memory 104 or the PPU memory 204 via a virtual memory address. The PPU 202 includes a PPU MMU 213, which processes requests from the PPU 202 for translating virtual memory addresses to physical memory addresses. The PPU 202 also includes a copy engine 212, which executes commands stored in the command queue 214 for copying memory pages, modifying data in the PPU page table 208, and other commands. A PPU fault handler 215 executes steps in response to a page fault on the PPU 202. The PPU fault handler 215 can be software running on a processor or dedicated microcontroller in the PPU 202. Alternatively, the PPU fault handler 215 can be combination of software running on the CPU 102 and software running on the dedicated microcontroller in the PPU 202, communicating with each other. In some embodiments, the CPU fault handler 211 and the PPU fault handler 215 can be a unified software program that is invoked by a fault on either the CPU 102 or the PPU 202. The command queue 214 may be in either the PPU memory 204 or the system memory 104, but is preferentially located in the system memory 104.

In some embodiments, the CPU fault handler 211 and the UVM driver 101 may be a unified software program. In such cases, the unified software program may be software that resides in the system memory 104 and executes on the CPU 102. The PPU fault handler 215 may be a separate software program running on a processor or dedicated microcontroller in the PPU 202, or the PPU fault handler 215 may be a separate software program running on the CPU 102.

In other embodiments, the PPU fault handler 215 and the UVM driver 101 may be a unified software program. In such cases, the unified software program may be software that resides in the system memory 104 and executes on the CPU 102. The CPU fault handler 211 may be a separate software program that resides in the system memory 104 and executes on the CPU 102.

In other embodiments, the CPU fault handler 211, the PPU fault handler 215, and the UVM driver 101 may be a unified software program. In such cases, the unified software program may be software that resides in the system memory 104 and executes on the CPU 102.

In some embodiments, the CPU fault handler 211, the PPU fault handler 215, and the UVM driver 101 may all reside in system memory 104, as described above. As shown in FIG. 2, the UVM driver 101 resides in system memory 104, while the CPU fault handler 211 and the PPU fault handler 215 reside in the CPU 102.

The CPU fault handler 211 and the PPU fault handler 215 are responsive to hardware interrupts that may emanate from the CPU 102 or the PPU 202, such as interrupts resulting from a page fault. As further described below, the UVM driver 101 includes instructions for performing various tasks related to management of the UVM system 200, including, without limitation, remedying a page fault, and accessing the CPU page table 206, the page state directory 210, and/or the fault buffer 216.

In some embodiments, the CPU page table 206 and the PPU page table 208 have different formats, and contain different information; for example, the PPU page table 208 may contain the following while the CPU page table 206 does not: atomic disable bit; compression tags; and memory swizzling type.

In a similar manner as with the system memory 104, the PPU memory 204 stores various memory pages (not shown). As shown, the PPU memory 204 also includes the PPU page table 208, which includes mappings between virtual memory addresses and physical memory addresses. Alternatively, the PPU page table 208 may be stored in the system memory 104.

Translating Virtual Memory Addresses

When a thread executing in the CPU 102 requests data via a virtual memory address, the CPU 102 requests translation of the virtual memory address to a physical memory address, from the CPU memory management unit (CPU MMU) 209. In response, the CPU MMU 209 attempts to translate the virtual memory address into a physical memory address, which specifies a location in a memory unit, such as the system memory 104, that stores the data requested by the CPU 102.

To translate a virtual memory address to a physical memory address, the CPU MMU 209 performs a lookup operation to determine if the CPU page table 206 includes a mapping associated with the virtual memory address. In addition to a virtual memory address, a request to access data may also indicate a virtual memory address space. The unified virtual memory system 200 may implement multiple virtual memory address spaces, each of which is assigned to one or more threads. Virtual memory addresses are unique within any given virtual memory address space. Further, virtual memory addresses within a given virtual memory address space are consistent across the CPU 102 and the PPU 202, thereby allowing the same virtual address to refer to the same data across the CPU 102 and the PPU 202. In some embodiments, two virtual memory addresses may refer to the same data, but may not map to the same physical memory address (e.g., the CPU 102 and the PPU 202 may each have a local read-only copy of the data.)

For any given virtual memory address, the CPU page table 206 may or may not include a mapping between the virtual memory address and a physical memory address. If the CPU page table 206 includes a mapping, then the CPU MMU 209 reads that mapping to determine a physical memory address associated with the virtual memory address and provides that physical memory address to the CPU 102. However, if the CPU page table 206 does not include a mapping associated with the virtual memory address, then the CPU MMU 209 is unable to translate the virtual memory address into a physical memory address, and the CPU MMU 209 generates a page fault. To remedy a page fault and make the requested data available to the CPU 102, a "page fault sequence" is executed. More specifically, the CPU 102 reads the PSD 210 to find the current mapping state of the memory page and then determines the appropriate page fault sequence. The page fault sequence generally maps the memory page associated with the requested virtual memory address or changes the types of accesses permitted (e.g., read access, write access, atomic access). The different types of page fault sequences implemented in the UVM system 200 are discussed in greater detail below.

Within the UVM system 200, data associated with a given virtual memory address may be stored in the system memory 104, in the PPU memory 204, or in both the system memory 104 and the PPU memory 204 as read-only copies of the same data. Further, for any such data, either or both of the CPU page table 206 or the PPU page table 208 may include a mapping associated with that data. Notably, some data exists for which a mapping exists in one page table, but not in the other. However, the PSD 210 includes all mappings stored in the PPU page table 208, and the PPU-relevant mappings stored in the CPU page table 206. The PSD 210 thus functions as a "master" page table for the unified virtual memory system 200. Therefore, when the CPU MMU 209 does not find a mapping in the CPU page table 206 associated with a particular virtual memory address, the CPU 102 reads the PSD 210 to determine whether the PSD 210 includes a mapping associated with that virtual memory address. Various embodiments of the PSD 210 may include different types of information associated with virtual memory addresses in addition to mappings associated with the virtual memory address.

When the CPU MMU 209 generates a page fault, the CPU fault handler 211 executes a sequence of operations for the appropriate page fault sequence to remedy the page fault. Again, during a page fault sequence, the CPU 102 reads the PSD 210 and executes additional operations in order to change the mappings or permissions within the CPU page table 206 and the PPU page table 208. Such operations may include reading and/or modifying the CPU page table 206, reading and/or modifying page state directory 210 entries, and/or migrating blocks of data referred to as "memory pages" between memory units (e.g., the system memory 104 and the PPU memory 204).

To determine which operations to execute in a page fault sequence, the CPU 102 identifies the memory page associated with the virtual memory address. The CPU 102 then reads state information for the memory page from the PSD 210 related to the virtual memory address associated with the memory access request that caused the page fault. Such state information may include, among other things, an ownership state for the memory page associated with the virtual memory address. For any given memory page, several ownership states are possible. For example, a memory page may be "CPU-owned," "PPU-owned," or "CPU-shared." A memory page is considered CPU-owned if the CPU 102 can access the memory page via a virtual address, and if the PPU 202 cannot access the memory page via a virtual address without causing a page fault. Preferably, a CPU-owned page resides in the system memory 104, but can reside in the PPU memory 204. A memory page is considered PPU-owned if the PPU 202 can access the page via a virtual address, and if the CPU 102 cannot access the memory page via a virtual address without causing a page fault. Preferably, a PPU-owned memory page resides in the PPU memory 204, but can reside in the system memory 104 when migration from the system memory 104 to the PPU memory 204 is not done, generally due to the short-term nature of the PPU ownership. Finally, a memory page is considered CPU-shared if the memory page is stored in the system memory 104 and a mapping to the memory page exists in the PPU page table 208 that allows the PPU 202 to access the memory page in the system memory 104 via a virtual memory address.

The UVM system 200 may assign ownership states to memory pages based on a variety of factors, including the usage history of the memory page. Usage history may include information regarding whether the CPU 102 or the PPU 202 accessed the memory page recently, and how many times such accesses were made. For example, the UVM system 200 may assign an ownership state of "CPU-owned" for a given memory page and locate the memory page in system memory 104 if, based on the usage history of the memory page, the UVM system 200 determines that the memory page is likely to be used mostly or only by the CPU 102. Similarly, the UVM system 200 may assign an ownership of "PPU-owned" for a given memory page and locate the memory page in PPU memory 204 if, based on the usage history of the memory page, the UVM system 200 determines that the memory page is likely to be used mostly or only by the PPU 202. Finally, the UVM system 200 may assign an ownership of "CPU-shared" for a given memory page if, based on the usage history of the memory page, the UVM system 200 determines that the memory page is likely to be used both by the CPU 102 and by the PPU 202, and that migrating the memory page back and forth from the system memory 104 to the PPU memory 204 would consume too much time.

As examples, the fault handlers 211 and 215 can implement any or all of the following heuristics for migrating:
  (a) on the CPU 102 access to an unmapped memory page that is mapped to the PPU 202, that has not been recently migrated, unmap the faulting memory page from the PPU 202, migrate the memory page to the CPU 102, and map the memory page to the CPU 102;
  (b) on the PPU 202 access to an unmapped memory page that is mapped to the
  CPU 102, that has not been recently migrated, unmap the faulting memory page from the CPU 102, migrate the memory page to the PPU 202, and map the memory page to the PPU 202;
  (c) on the CPU 102 access to an unmapped memory page that is mapped to the PPU 202, that has been recently migrated, migrate the faulting memory page to the CPU 102 and map the memory page on both the CPU 102 and the PPU 202;

(d) on the PPU 102 access to an unmapped memory page that is mapped on the CPU 102, that has been recently migrated, map the memory page to both the CPU 102 and the PPU 202;

(e) on the PPU 102 atomic access to a memory page that is mapped to both the CPU 102 and the PPU 202 but not enabled for atomic operations by the PPU 202, unmap the memory page from the CPU 102, and map the memory page to the PPU 202 with atomic operations enabled;

(f) on the PPU 102 write access to a memory page that is mapped on the CPU 102 and PPU 202 as copy-on-write (COW), copy the memory page to the PPU 202, thereby making independent copies of the memory page, map the new memory page as read-write on the PPU, and leave the current memory page as mapped on the CPU 102;

(g) on the PPU 102 read access to a memory page that is mapped on the CPU 102 and PPU 202 as zero-fill-on-demand (ZFOD), allocate a memory page of physical memory on the PPU 202 and fill it with zeros, and map that memory page on the PPU, but change it to unmapped on the CPU 102;

(h) on an access by a first PPU 202(1) to an unmapped memory page that is mapped on a second PPU 202(2), that has not been recently migrated, unmap the faulting memory page from the second PPU 202(2), migrate the memory page to the first PPU 202(1), and map the memory page to the first PPU 202(1); and (i) on an access by a first PPU 202(1) to an unmapped memory page that is mapped on a second PPU 202(2), that has been recently migrated, map the faulting memory page to the first PPU 202(1), and keep the mapping of the memory page on the second PPU 202(2).

In sum, many heuristic rules are possible, and the scope of the present invention is not limited to these examples.

In addition, any migration heuristic can "round up" to include more memory pages or a larger memory page size, for example:

(j) on the CPU 102 access to an unmapped memory page that is mapped to the PPU 202, that has not been recently migrated, unmap the faulting memory page, plus additional memory pages that are adjacent to the faulting memory page in the virtual address space, from the PPU 202, migrate the memory pages to the CPU 102, and map the memory pages to the CPU 102 (in more detailed example: for a 4 kB faulted memory page, migrate the aligned 64 kB region that includes the 4 kB faulted memory page);

(k) on the PPU 202 access to an unmapped memory page that is mapped to the CPU 102, that has not been recently migrated, unmap the faulting memory page, plus additional memory pages that are adjacent to the faulting memory page in the virtual address space, from the CPU 102, migrate the memory pages to the PPU 202, and map the memory pages to the PPU 202 (in more detailed example: for a 4 kB faulted memory page, migrate the aligned 64 kB region that includes the 4 kB faulted memory page);

(l) on the CPU 102 access to an unmapped memory page that is mapped to the PPU 202, that has not been recently migrated, unmap the faulting memory page, plus additional memory pages that are adjacent to the faulting memory page in the virtual address space, from the PPU 202, migrate the memory pages to the CPU 102, map the memory pages to the CPU 102, and treat all the migrated memory pages as one or more larger memory pages on the CPU 102 (in more detailed example: for a 4 kB faulted memory page, migrate the aligned 64 kB region that includes the 4 kB faulted memory page, and treat the aligned 64 kB region as a 64 kB memory page);

(m) on the PPU 202 access to an unmapped memory page that is mapped on the CPU 102, that has not been recently migrated, unmap the faulting memory page, plus additional memory pages that are adjacent to the faulting memory page in the virtual address space, from the CPU 102, migrate the memory pages to the PPU 202, map the memory pages to the PPU 202, and treat all the migrated memory pages as one or more larger memory pages on the PPU 202 (in more detailed example: for a 4 kB faulted memory page, migrate the aligned 64 kB region that includes the 4 kB faulted memory page, and treat the aligned 64 kB region as a 64 kB memory page);

(n) on the access by a first PPU 202(1) to an unmapped memory page that is mapped to a second PPU 202(2), that has not been recently migrated, unmap the faulting memory page, plus additional memory pages that are adjacent to the faulting memory page in the virtual address space, from the second PPU 202(2), migrate the memory pages to the first PPU 202(1), and map the memory pages to the first PPU 202(1); and (o) on an access by a first PPU 202(1) to an unmapped memory page that is mapped to a second PPU 202(2), that has been recently migrated, map the faulting memory page, plus additional memory pages that are adjacent to the faulting memory page in the virtual address space, to the first PPU 202(1), and keep the mapping of the memory page on the second PPU 202(2).

In sum, many heuristic rules that include "rounding up" are possible, and scope of the present invention is not limited to these examples.

In some embodiments, the PSD entries may include transitional state information to ensure proper synchronization between various requests made by units within the CPU 102 and the PPU 202. For example, a PSD 210 entry may include a transitional state indicating that a particular memory page is in the process of being transitioned from CPU-owned to PPU-owned. Various units in the CPU 102 and the PPU 202, such as the CPU fault handler 211 and the PPU fault handler 215, upon determining that a memory page is in such a transitional state, may forego portions of a page fault sequence to avoid steps in a page fault sequence triggered by a prior virtual memory access to the same virtual memory address. As a specific example, if a page fault results in a memory page being migrated from the system memory 104 to the PPU memory 204, a different page fault that would cause the same migration is detected and does not cause another memory page migration. Further, various units in the CPU 102 and the PPU 202 may implement atomic operations for proper ordering of operations on the PSD 210. For example, for modifications to PSD 210 entries, the CPU fault handler 211 or the PPU fault handler 215 may issue an atomic compare and swap operation to modify the memory page state of a particular entry in the PSD 210. Consequently, the modification is done without interference by operations from other units.

Multiple PSDs 210 may be stored in the system memory 104—one for each virtual memory address space. A memory access request generated by either the CPU 102 or the PPU 202 may therefore include a virtual memory address and also identify the virtual memory address space associated with that virtual memory address.

Just as the CPU 102 may execute memory access requests that include virtual memory addresses (i.e., instructions that include requests to access data via a virtual memory address), the PPU 202 may also execute similar types of memory access requests. More specifically, the PPU 202 includes a plurality of execution units, such as GPCs and SMs, described above in conjunction with FIG. 1, that are configured to execute multiple threads and thread groups. In operation, those threads may request data from memory (e.g., the system memory 104 or the PPU memory 204) by specifying a virtual memory address. Just as with the CPU 102 and the CPU MMU 209, the PPU 202 includes the PPU memory management unit (MMU) 213. The PPU MMU 213 receives requests for translation of virtual memory addresses from the PPU 202, and attempts to provide a translation from the PPU page table 208 for the virtual memory addresses.

Similar to the CPU page table 206, the PPU page table 208 includes mappings between virtual memory addresses and physical memory addresses. As is also the case with the CPU page table 206, for any given virtual address, the PPU page table 208 may not include a page table entry that maps the virtual memory address to a physical memory address. As with the CPU MMU 209, when the PPU MMU 213 requests a translation for a virtual memory address from the PPU page table 208 and either no mapping exists in the PPU page table 208 or the type of access is not allowed by the PPU page table 208, the PPU MMU 213 generates a page fault. Subsequently, the PPU fault handler 215 triggers a page fault sequence. Again, the different types of page fault sequences implemented in the UVM system 200 are described in greater detail below.

During a page fault sequence, the CPU 102 or the PPU 202 may write commands into the command queue 214 for execution by the copy engine 212. Such an approach frees up the CPU 102 or the PPU 202 to execute other tasks while the copy engine 212 reads and executes the commands stored in the command queue 214, and allow all the commands for a fault sequence to be queued at one time, thereby avoiding the monitoring of progress of the fault sequence. Commands executed by the copy engine 212 may include, among other things, deleting, creating, or modifying page table entries in the PPU page table 208, reading or writing data from the system memory 104, and reading or writing data to the PPU memory 204.

The fault buffer 216 stores fault buffer entries that indicate information related to page faults generated by the PPU 202. Fault buffer entries may include, for example, the type of access that was attempted (e.g., read, write, or atomic), the virtual memory address for which an attempted access caused a page fault, the virtual address space, and an indication of a unit or thread that caused a page fault. In operation, when the PPU 202 causes a page fault, the PPU 202 may write a fault buffer entry into the fault buffer 216 to inform the PPU fault handler 215 about the faulting memory page and the type of access that caused the fault. The PPU fault handler 215 then performs actions to remedy the page fault. The fault buffer 216 can store multiple faults because the PPU 202 is executing a plurality of threads, where each thread can cause a one or more faults due the pipelined nature of the memory accesses of the PPU 202.

Page Fault Sequences

As stated above, in response to receiving a request for translation of a virtual memory address, the CPU MMU 209 generates a page fault if the CPU page table 206 does not include a mapping associated with the requested virtual memory address or does not permit the type of access being requested. Similarly, in response to receiving a request for translation of a virtual memory address, the PPU MMU 213 generates a page fault if the PPU page table 208 does not include a mapping associated with the requested virtual memory address or does not permit the type of access being requested. When the CPU MMU 209 or the PPU MMU 213 generates a page fault, the thread that requested the data at the virtual memory address stalls, and a "local fault handler"—the CPU fault handler 211 for the CPU 102 or the PPU fault handler 215 for the PPU 202—attempts to remedy the page fault by executing a "page fault sequence." As indicated above, a page fault sequence includes a series of operations that enable the faulting unit (i.e., the unit—either the CPU 102 or the PPU 202—that caused the page fault) to access the data associated with the virtual memory address. After the page fault sequence completes, the thread that requested the data via the virtual memory address resumes execution. In some embodiments, fault recovery is simplified by allowing the fault recovery logic to track faulting memory accesses as opposed to faulting instructions.

The operations executed during a page fault sequence depend on the change in ownership state or change in access permissions, if any, that the memory page associated with the page fault has to undergo. The transition from a current ownership state to a new ownership state, or a change in access permissions, may be part of the page fault sequence. In some instances, migrating the memory page associated with the page fault from the system memory 104 to the PPU memory 204 is also part of the page fault sequence. In other instances, migrating the memory page associated with the page fault from the PPU memory 204 to the system memory 104 is also part of the page fault sequence. Various heuristics, more fully described herein, may be used to configure UVM system 200 to change memory page ownership state or to migrate memory pages under various sets of operating conditions and patterns. Described in greater detail below are page fault sequences for the following four memory page ownership state transitions: CPU-owned to CPU-shared, CPU-owned to PPU-owned, PPU-owned to CPU-owned, and PPU-owned to CPU-shared.

A fault by the PPU 202 may initiate a transition from CPU-owned to CPU-shared. Prior to such a transition, a thread executing in the PPU 202 attempts to access data at a virtual memory address that is not mapped in the PPU page table 208. This access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state as well as other factors, such as usage characteristics for the memory page or the type of memory access, the PPU fault handler 215 determines that a new ownership state for the memory page should be CPU-shared.

To change the ownership state, the PPU fault handler 215 writes a new entry in the PPU page table 208 corresponding to the virtual memory address and associating the virtual memory address with the memory page identified via the PSD 210 entry. The PPU fault handler 215 also modifies the PSD 210 entry for that memory page to indicate that the ownership state is CPU-shared. In some embodiments, an entry in a translation look-aside buffer (TLBs) in the PPU 202 is invalidated to account for the case where the translation to an invalid memory page is cached. At this point, the page fault sequence is complete. The ownership state for the memory page is CPU-shared, meaning that the memory page is accessible to both the CPU 102 and the PPU 202. Both the CPU page table 206 and the PPU page table 208 include entries that associate the virtual memory address to the memory page.

A fault by the PPU 202 may initiate a transition from CPU-owned to PPU-owned. Prior to such a transition, an operation executing in the PPU 202 attempts to access memory at a virtual memory address that is not mapped in the PPU page table 208. This memory access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state, as well as other factors, such as usage characteristics for the memory page or the type of memory access, the PPU fault handler 215 determines that a new ownership state for the memory page is PPU-owned.

To change the ownership state, the CPU 102 removes the mapping in the CPU page table 206 associated with the virtual memory address that caused the page fault. The CPU 102 may flush caches before and/or after the mapping is removed. The CPU 102 also writes commands into the command queue 214 instructing the PPU 202 to copy the memory page from the system memory 104 into the PPU memory 204. The copy engine 212 in the PPU 202 reads the commands in the command queue 214 and copies the memory page from the system memory 104 to the PPU memory 204. The PPU 202 writes a page table entry into the PPU page table 208 corresponding to the virtual memory address and associating the virtual memory address with the newly-copied memory page in the PPU memory 204. The writing to the PPU page table 208 may be done via the copy engine 212. Alternatively, the CPU 102 can update the PPU page table 208. The PPU fault handler 215 also modifies the PSD 210 entry for that memory page to indicate that the ownership state is PPU-owned. In some embodiments, entries in TLBs in the PPU 202 or the CPU 102 may be invalidated, to account for the case where the translation was cached. At this point, the page fault sequence is complete. The ownership state for the memory page is PPU-owned, meaning that the memory page is accessible only to the PPU 202. Only the PPU page table 208 includes an entry that associates the virtual memory address with the memory page.

A fault by the CPU 102 may initiate a transition from PPU-owned to CPU-owned. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state, as well as other factors, such as usage characteristics for the memory page or the type of access, the CPU fault handler 211 determines that a new ownership state for the memory page is CPU-owned.

The CPU fault handler 211 changes the ownership state associated with the memory page to CPU-owned. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104, which may be done via the command queue 214 and the copy engine 212. The CPU fault handler 211 writes a page table entry into the CPU page table 206 that associates the virtual memory address with the memory page that is copied into the system memory 104. The CPU fault handler 211 also updates the PSD 210 to associate the virtual memory address with the newly copied memory page. At this point, the page fault sequence is complete. The ownership state for the memory page is CPU-owned, meaning that the memory page is accessible only to the CPU 102. Only the CPU page table 206 includes an entry that associates the virtual memory address with the memory page.

A fault by the CPU 102 may initiate a transition from PPU-owned to CPU-shared. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state or the type of access, as well as other factors, such as usage characteristics for the memory page, the CPU fault handler 211 determines that a new ownership state for the memory page is CPU-shared.

The CPU fault handler 211 changes the ownership state associated with the memory page to CPU-shared. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104. This copy operation may be done via the command queue 214 and the copy engine 212. The CPU fault handler 211 then writes a command into the command queue 214 to cause the copy engine 212 to change the entry in PPU page table 208 such that the virtual memory address is associated with the memory page in the system memory 104. Various TLB entries may be invalidated. The CPU fault handler 211 writes a page table entry into the CPU page table 206 to associate the virtual memory address with the memory page in the system memory 104. The CPU fault handler 211 also updates the PSD 210 to associate the virtual memory address with the memory page in system memory 104. At this point, the page fault sequence is complete. The ownership state for the memory page is CPU-shared, and the memory page has been copied into the system memory 104. The memory page is accessible to the CPU 102, since the CPU page table 206 includes an entry that associates the virtual memory address with the memory page in the system memory 104. The memory page is also accessible to the PPU 202, since the PPU page table 208 includes an entry that associates the virtual memory address with the memory page in the system memory 104.

Detailed Example of a Page Fault Sequence

With this context, a detailed description of a page fault sequence executed by the PPU fault handler 215 in the event of a transition from CPU-owned to CPU-shared is now provided to show how atomic operations and transition states may be used to more effectively manage a page fault sequence. The page fault sequence is triggered by a PPU 202 thread attempting to access a virtual address for which a mapping does not exist in the PPU page table 208. When a thread attempts to access data via a virtual memory address, the PPU 202 (specifically, a user-level thread) requests a translation from the PPU page table 208. A PPU page fault occurs in response because the PPU page table 208 does not include a mapping associated with the requested virtual memory address.

After the page fault occurs, the thread enters a trap, stalls, and the PPU fault handler 215 executes a page fault sequence. The PPU fault handler 215 reads the PSD 210 to determine which memory page is associated with the virtual memory address and to determine the state for the virtual memory address. The PPU fault handler 215 determines, from the PSD 210, that the ownership state for that memory page is CPU-owned. Consequently, the data requested by the PPU 202 is inaccessible to the PPU 202 via a virtual memory address. State information for the memory page also indicates that the requested data cannot be migrated to the PPU memory 204.

Based on the state information obtained from the PSD 210, the PPU fault handler 215 determines that a new state for the memory page should be CPU-shared. The PPU fault handler 215 changes the state to "transitioning to CPU-shared." This state indicates that the memory page is currently in the process of being transitioned to CPU-shared. When the PPU fault handler 215 runs on a microcontroller in the memory management unit, then two processors will update the PSD 210 asynchronously, using atomic compare-and-swap ("CAS") operations on the PSD 210 to change the state to "transitioning to PPU visible," (CPU-shared).

The PPU 202 updates the PPU page table 208 to associate the virtual address with the memory page. The PPU 202 also invalidates the TLB cache entries. Next, the PPU 202 performs another atomic compare-and-swap operation on the PSD 210 to change the ownership state associated with the memory page to CPU-shared. Finally, the page fault sequence ends, and the thread that requested the data via the virtual memory address resumes execution.

UVM System Architecture Variations

Various modifications to the unified virtual memory system 200 are possible. For example, in some embodiments, after writing a fault buffer entry into the fault buffer 216, the PPU 202 may trigger a CPU interrupt to cause the CPU 102 to read fault buffer entries in the fault buffer 216 and perform whatever operations are appropriate in response to the fault buffer entry. In other embodiments, the CPU 102 may periodically poll the fault buffer 216. In the event that the CPU 102 finds a fault buffer entry in the fault buffer 216, the CPU 102 executes a series of operations in response to the fault buffer entry.

In some embodiments, the system memory 104, rather than the PPU memory 204, stores the PPU page table 208. In other embodiments, a single or multiple-level cache hierarchy, such as a single or multiple-level translation look-aside buffer (TLB) hierarchy (not shown), may be implemented to cache virtual address translations for either the CPU page table 206 or the PPU page table 208.

In yet other embodiments, in the event that a thread executing in the PPU 202 causes a PPU fault (a "faulting thread"), the PPU 202 may take one or more actions. These actions include: stall the entire PPU 202, stall the SM executing the faulting thread, stall the PPU MMU 213, stall only the faulting thread, or stall one or more levels of TLBs. In some embodiments, after a PPU page fault occurs, and a page fault sequence has been executed by the unified virtual memory system 200, execution of the faulting thread resumes, and the faulting thread attempts, again, to execute the memory access request that caused the page fault. In some embodiments, stalling at a TLB is done in such a way as to appear as a long-latency memory access to the faulting SM or faulting thread, thereby not requiring the SM to do any special operation for a fault.

Finally, in other alternative embodiments, the UVM driver 101 may include instructions that cause the CPU 102 to execute one or more operations for managing the UVM system 200 and remedying a page fault, such as accessing the CPU page table 206, the PSD 210, and/or the fault buffer 216. In other embodiments, an operating system kernel (not shown) may be configured to manage the UVM system 200 and remedy a page fault by accessing the CPU page table 206, the PSD 210, and/or the fault buffer 216. In yet other embodiments, an operating system kernel may operate in conjunction with the UVM driver 101 to manage the UVM system 200 and remedy a page fault by accessing the CPU page table 206, the PSD 210, and/or the fault buffer 21.

Opportunistic Page Migration

Figure 3:
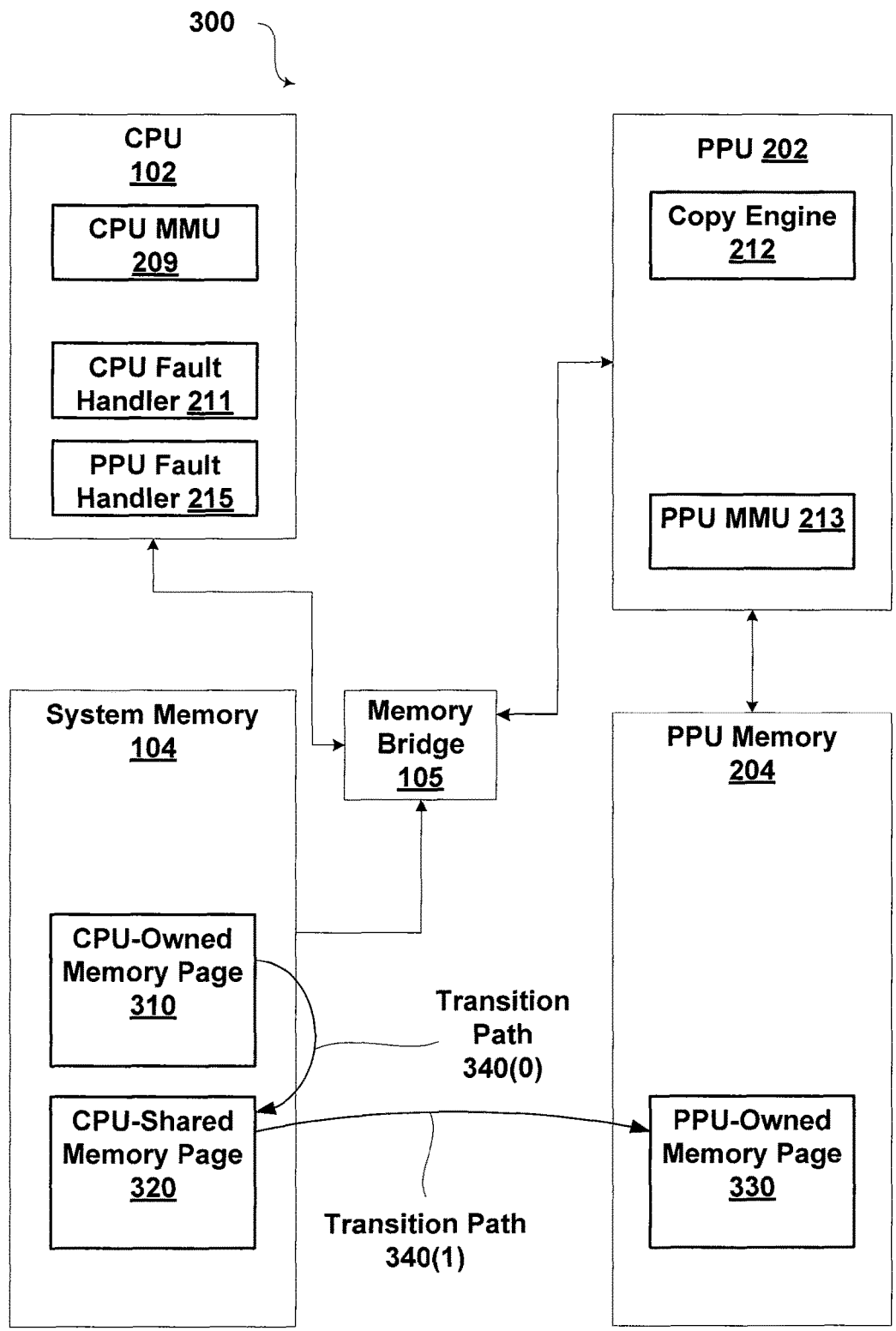
FIG. 3 is a block diagram illustrating a unified virtual memory (UVM) system, according to another embodiment of the present invention.

FIG. 3 is a block diagram illustrating a unified virtual memory (UVM) system 300, according to another embodiment of the present invention. As shown, the unified virtual memory system 200 includes, without limitation, the CPU 102, the system memory 104, and the parallel processing unit (PPU) 202 coupled to a parallel processing unit memory (PPU memory) 204. The CPU 102 and the system memory 104 are coupled to each other and to the PPU 202 via the memory bridge 105. The CPU 102, system memory 104, PPU 202, PPU memory 204, and memory bridge 105 function substantially the same as described in conjunction with FIG. 2, except as further described below.

When the CPU 102 allocates a new memory page, the memory page may be initialized as a CPU-owned memory page 310 residing in the system memory 104. The CPU 102 generally has read/write access to the CPU-owned memory page 310, while the PPU 202 has no access to the CPU-owned memory page 310. If the PPU 202 subsequently accesses the CPU-owned memory page 310, a page fault is generated. The CPU-owned memory page 310 transitions to a CPU-shared memory page 320, as shown by transition path 340(0). The CPU-shared memory page 320 may occupy the same memory locations in the system memory 104 as the CPU-owned memory page 310. However, the CPU page table 210, PPU page table 208, and page state directory 210 are updated to reflect that both the CPU 202 and PPU may access the CPU-shared memory page 320. The CPU-shared memory page 320 may be identified for later migration from the system memory 104 to the PPU memory 204. When the memory page is migrated from the system memory 104 to the PPU memory 204, the CPU-shared memory page 320 transitions to a PPU-owned memory page 330, as shown by transition path 340(1).

In some embodiments, the CPU-shared memory page 320 may be identified for later migration upon meeting certain conditions, including, without limitation, the quantity of PPU 202 accesses of the CPU-shared memory page 320 exceed a threshold amount, or the CPU 102 does not access the CPU-shared memory page 320 for a specified time period. The CPU-shared memory page 320 may then be migrated from the system memory 104 to the PPU memory 204. During migration, a memory page is allocated in PPU memory 204, the contents of the CPU-shared memory page 320 are copied to the allocated memory page, and the allocated memory page is identified as a PPU-owned memory page 330. The CPU-shared memory page 320 may then be identified as a free memory page that is available for subsequent allocation. If the CPU 102 subsequently attempts to access the PPU-owned memory page 330, the PPU-owned memory page 330 is migrated from PPU memory 204 back to system memory 104, and identified as a CPU-shared memory page 320.

With opportunistic migration, a CPU-owned memory page 310 that is accessed by the PPU 202 may not be migrated immediately to PPU memory 204. Rather, the CPU-owned memory page 310 may initially be identified as a CPU-shared memory page 320, and migration of the memory page to PPU memory 204 may be deferred to a later time.

In one embodiment, memory pages in system memory 104 and PPU memory 204 may occupy 4 kbytes each. At any given time, each valid memory page in system memory 104 and PPU memory 204 may be identified as having one of three states: CPU-owned, PPU-owned, and CPU-shared. A CPU-owned memory page 310 is mapped by the CPU 102 in system memory 104. No PPU 202 has a mapping for the CPU-owned memory page 310. Only the CPU 102 may access a CPU-owned memory page 310. A PPU-owned memory page 330 is mapped by one PPU 202 in the PPU memory 204 corresponding to that PPU 202. Alternatively, the PPU-owned memory page 330 is mapped by one PPU 202 in the frame buffer memory (not explicitly shown) corresponding to that PPU 202. The CPU 102 and other PPUs 202 do not have a mapping for the PPU-owned memory page 330. Only the one PPU 202 may access a PPU-owned memory page 330. A CPU-shared memory page 320 is mapped by the CPU 102 and one or more PPUs 202. The PPUs 202 may access the CPU-shared memory page 320 over a communications path, such as a PCIe bus. The CPU-shared memory page 320 is mapped to system memory 104. Generally, only memory pages in system memory may be identified as CPU-shared. As further described herein, a memory page may momentarily have other transitional states as the memory page migrates between system memory 104 and PPU memory 204.

Memory pages accessed only by the CPU 102 may remain in the CPU-owned state. Memory pages that are accessed by both the CPU 102 and one or more PPUs 202 may transition to the CPU-shared state. Memory pages accessed often by one PPU 202 and rarely accessed by the CPU 102 or other PPUs 202 may transition to the PPU-owned state.

The UVM driver 101 employs various techniques to decide when to set the state of a memory page to CPU-shared versus when to migrate the memory page from the system memory 104 to PPU memory 204 and set the state of a memory page to PPU-owned. If a CPU-shared memory page is accessed often by a PPU 202, then performance may improve by migrating such a memory page from system memory 104 to PPU memory 204 and setting the state of the memory page to PPU-owned. If a PPU-owned memory page is accessed only occasionally by a PPU 202, and the memory page is also accessed occasionally by the CPU 102, then performance may improve by migrating such a memory page from PPU memory 204 to system memory 104 and setting the state of the memory page to CPU-shared.

When the PPU 202 first accesses a CPU-owned memory page, the memory access operation causes a trap to occur. The UVM driver 101 identifies the memory page as CPU-shared. The UVM driver 101 may later migrate the memory page from the system memory 104 to the PPU memory 204 by unmapping the memory page from the CPU 102, copying the memory page from the system memory 104 to the PPU memory 204, and mapping the memory page on the PPU 202, such that the memory page becomes PPU-owned.

In some embodiments, a CPU memory page in system memory 104 may be 4 kbytes, while a PPU memory page in PPU memory 204 may be 64 kbytes or 128 kbytes. For example, a 64-kbyte PPU memory page would map to a corresponding set of sixteen 4 kbyte CPU memory pages. Likewise, a 128-kbyte PPU memory page would map to a corresponding set of thirty-two 4 kbyte CPU memory pages. The set of 4 kbyte CPU memory pages that map to the same large PPU memory page may be referred to as "siblings." Typically, when a 4 kbyte memory page migrates from the system memory 104 to the PPU memory 204, the siblings of the migrating memory page may be migrated as well. This approach may improve PCIe bus performance, where PCIe bus transfers are optimized for larger memory page sizes. This approach may also provide more efficient use of the memory management unit (MMU) in the PPU 202.

If the CPU 102 accesses a memory page that has previously migrated from the system memory 104 to the PPU memory 204, then the memory page is migrated back to the system memory 104, and mapped to the memory space of the CPU 102. The UVM driver 101 migrates the memory page from the PPU memory 204 to the system memory 104 by unmapping the memory page from the PPU 204, copying the memory page from the PPU memory 204 to the system memory 104, and mapping the memory page on the CPU 102. The UVM driver 101 may migrate only the 4 kbyte memory page accessed by the CPU 102, or may also migrate the sibling memory pages of the accessed 4 kbyte memory page. The UVM driver 101 may use heuristic approaches to determine whether to migrate the sibling memory pages based on the likelihood of the CPU 102 accessing the sibling memory pages. The UVM driver 101 may set the state of the migrated memory page as CPU-owned, such that a subsequent access of the memory page by the PPU 202 causes a page fault. When such a fault occurs, the memory page may either be migrated back to the PPU memory 204, or the state of the memory page may be changed from CPU-owned to CPU-shared. Alternatively, the UVM driver 101 may immediately set the state of the migrated memory page as CPU-shared, such that a subsequent access of the memory page by the PPU 202 does not cause a page fault.

Although the UVM driver 101 may not know future memory access patterns, the UVM driver 101 may nevertheless determine a migration strategy based on various consideration, including, without limitation: (1) reducing thrashing caused by memory pages that migrate frequently between CPU-owned and PPU-owned states by changing the state of such memory pages to CPU-shared; (2) detecting CPU-shared memory pages not recently referenced by the CPU 102 and identifying such memory pages for migration to the PPU memory 204; and (3) detecting CPU-shared memory pages being referenced frequently by the PPU 202 and identifying such memory pages for migration to the PPU memory 204.

For example, the UVM driver 101 could use heuristic information to first change the state of a memory page from CPU-owned to CPU-shared the first time the memory page is accessed by the PPU 202, allowing for PPU 202 execution to resume quickly. The UVM driver 101 could later aggregate multiple memory pages, such as a set of sibling memory pages, and migrate the multiple memory pages as a group from the system memory 104 to the PPU memory 204. The UVM driver 101 would then change the state of the migrated memory pages to PPU-owned. Likewise, when sibling memory pages are split between the system memory 104 and the PPU memory 204, the UVM driver 101 could set the state of system memory 104 resident memory pages to CPU-shared. The UVM driver 101 would then gather additional memory access pattern information in order to determine whether to migrate the memory pages to PPU memory 204.

As further described below, the PPU 202 attempts to write or read a memory location in a CPU-owned memory page, resulting in a page fault. Because the PPU 202 is not allowed to access a CPU-owned memory page, the memory page state is changed from CPU-owned to CPU-shared, allowing the write or read issued by the PPU 202 to complete. The memory page is scheduled for possible later migration from system memory 104 to PPU memory 204. Once the memory page has migrated from system memory 104 to PPU memory 204, the memory page state is changed from CPU-shared to PPU-owned.

Figure 4A:
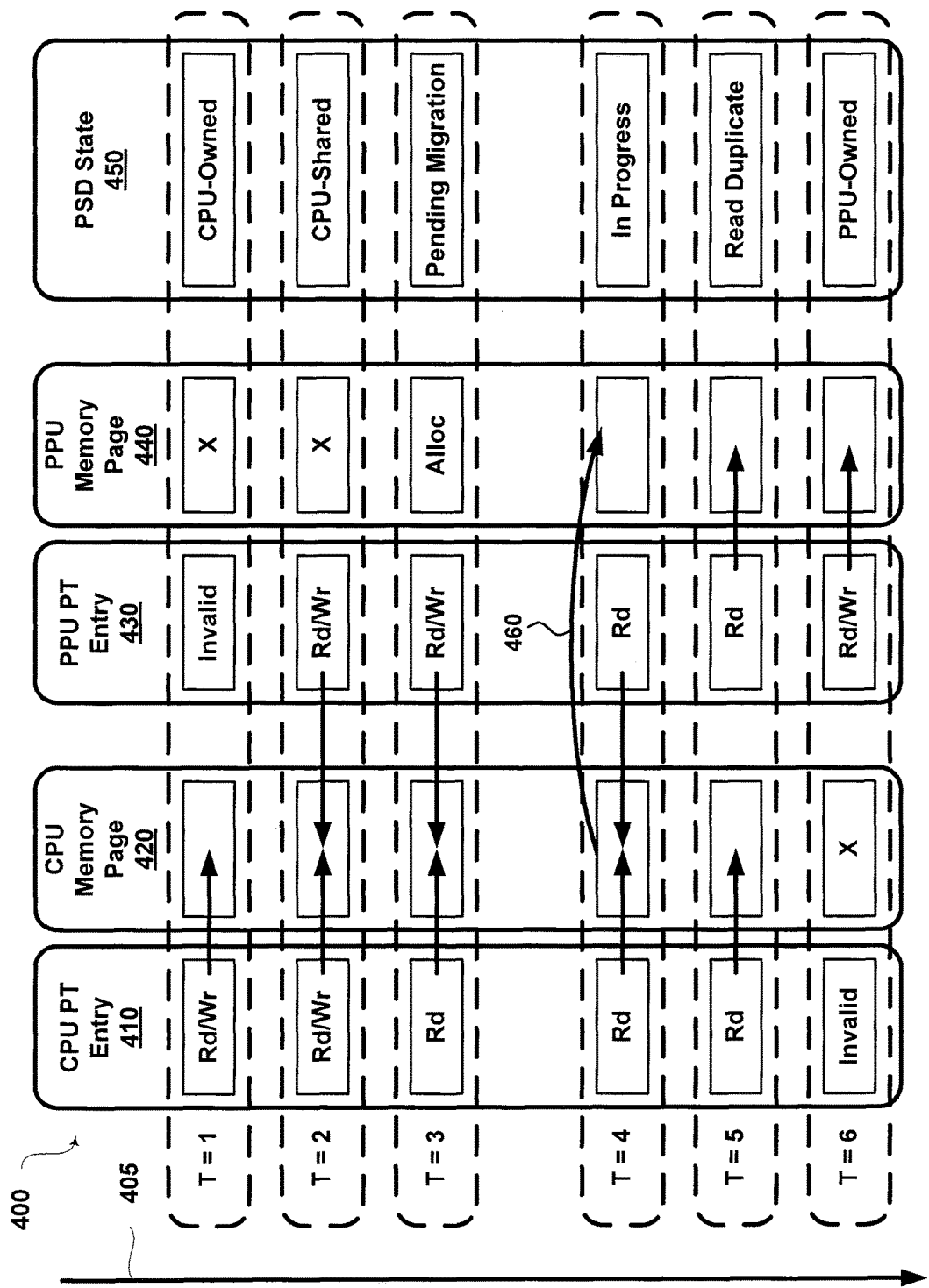
FIG. 4A illustrates a series of memory page states as a memory page migrates from system memory to PPU memory, according to one embodiment of the present invention.

FIG. 4A illustrates a series of memory page state transitions 400 as a memory page migrates from system memory 104 to PPU memory 204, according to one embodiment of the present invention. The series of memory page state transitions 400 corresponds to state transitions that occur when the PPU 202 generates a memory write operation directed to a CPU-owned memory page. As shown, the series of memory page state transitions 400 includes a CPU page table (PT) entry 410 and corresponding CPU memory page 420, a PPU page table (PT) entry 430 and corresponding PPU memory page 440, and a PSD state 450 for the corresponding CPU memory page 420 and PPU memory page 440. The series of memory page state transitions 400 is shown as time 405 progresses from time T=1 through time T=6.

At time T=1, the CPU page table entry 410 is updated to indicate that the CPU 102 has read/write (Rd/Wr) access to the CPU memory page 420, where the CPU memory page 420 resides in system memory 104. The PPU page table entry 430 is updated to invalid to indicate that the PPU 202 has no access to the CPU memory page 420 and no mapping to a corresponding PPU memory page 440. The PPU memory page 440 is shown in a "don't care" (X) state to indicate that no memory page is mapped in PPU memory 204. The PSD state 450 corresponding to this condition is identified as CPU-owned.

At time T=2, the CPU page table entry 410 remains in the same state as time T=1 to indicate that the CPU 102 has read/write (Rd/Wr) access to the CPU memory page 420. The PPU page table entry 430 is updated to indicate that the PPU 202 has read/write access to the CPU memory page 420 and no mapping to a corresponding PPU memory page 440. The PPU memory page 440 is shown in a "don't care" state to indicate that no memory page is mapped in PPU memory 204. The PSD state 450 corresponding to this condition is identified as CPU-shared.

At time T=3, the CPU page table entry 410 is updated to indicate that the CPU 102 has read-only (Rd) access to the CPU memory page 420. The PPU page table entry 430 remains in the same state as time T=2 to indicate that the PPU 202 has read/write to the CPU memory page 420 and no mapping to a corresponding PPU memory page 440. The PPU memory page 440 is shown in an "allocated" (alloc) state to indicate that a memory page is allocated in PPU memory 440, but the memory page is currently unmapped in the PPU page table. The PSD state 450 corresponding to this condition is identified as pending migration.

At time T=4, the CPU page table entry 410 remains in the same state as time T=3 to indicate that the CPU 102 has read-only access to the CPU memory page 420. The PPU page table entry 430 is updated to indicate that the PPU 202 also has read-only access to the CPU memory page 420 and no mapping to a corresponding PPU memory page 440. The CPU memory page 420 is copied to the allocated PPU memory page 440, as illustrated by path 460. Because neither the CPU 102 nor the PPU 202 has write access to the CPU memory page 420, no data is written to the CPU memory page 420 as the CPU memory page 420 is copied to the allocated PPU memory page 440. The PSD state 450 corresponding to this condition is identified as in progress.

At time T=5, the CPU page table entry 410 remains in the same state as time T=3 to indicate that the CPU 102 has read-only access to the CPU memory page 420. The PPU page table entry 430 is updated to indicate that the PPU 202 has read-only access to the copy of the CPU memory page 420 that now resides in the allocated PPU memory page 440 in PPU memory 204. The PSD state 450 corresponding to this condition is identified as read duplicate.

At time T=6, the CPU page table entry 410 is updated to invalid to indicate that the PPU 202 no longer has access to the CPU memory page 420. The CPU memory page 420 is shown in a "don't care" (X) state to indicate that no memory page is mapped in system memory 104, and the CPU memory page 420 is now free to be allocated for some other purpose. The PPU page table entry 430 is updated to indicate that the PPU 202 has read/write access to the PPU memory page 440. The PSD state 450 corresponding to this condition is identified as PPU-owned.

Figure 4B:
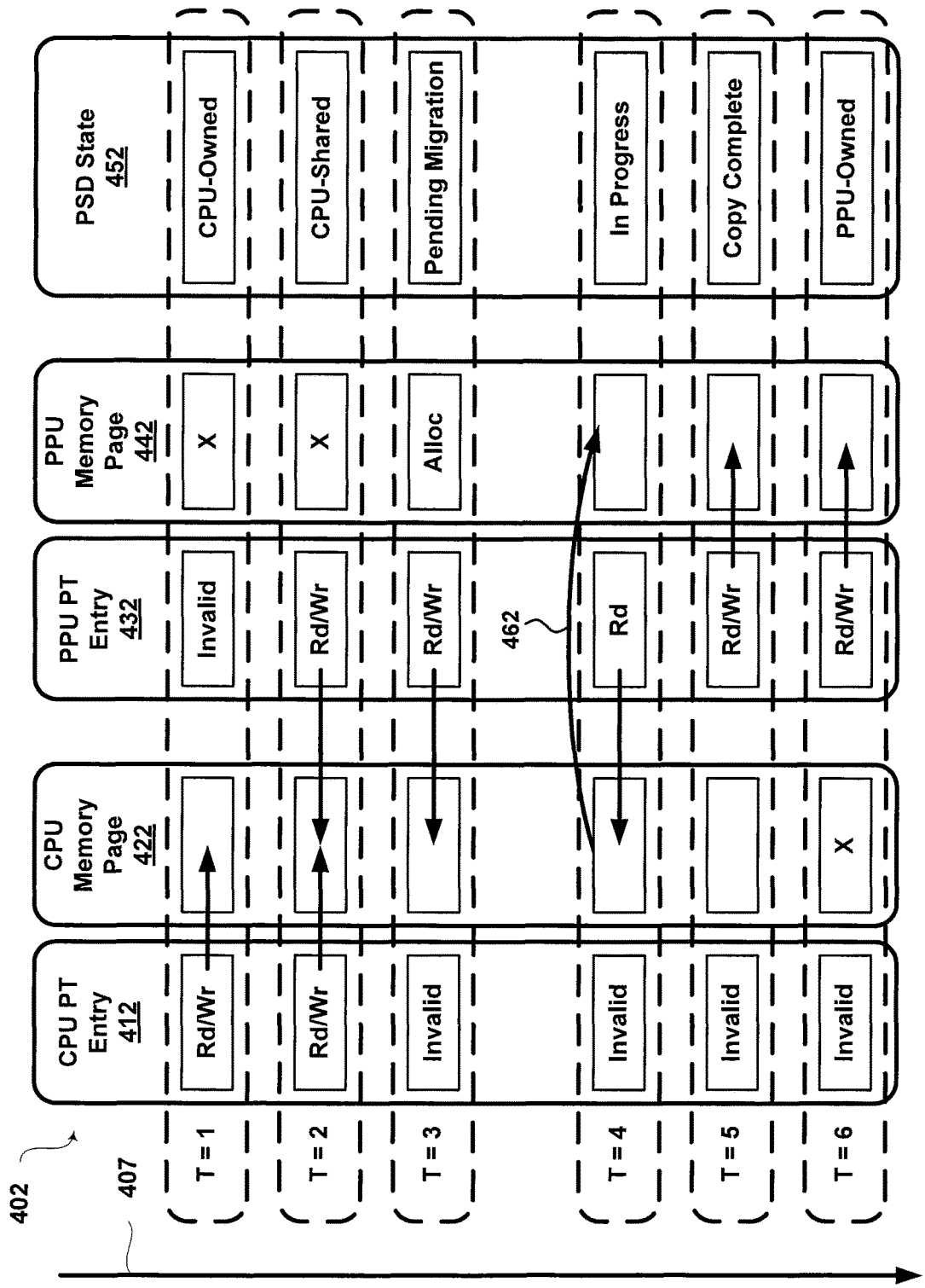
FIG. 4B illustrates a series of memory page states as a memory page migrates from system memory to PPU memory, according to another embodiment of the present invention.

FIG. 4B illustrates a series of memory page state transitions 402 as a memory page migrates from system memory 104 to PPU memory 204, according to another embodiment of the present invention. The series of memory page state transitions 402 corresponds to state transitions that occur when the PPU 202 generates a memory write operation directed to a CPU-owned memory page. As shown, the series of memory page state transitions 402 includes a CPU page table (PT) entry 412 and corresponding CPU memory page 422, a PPU page table (PT) entry 432 and corresponding PPU memory page 442, and a PSD state 452 for the corresponding CPU memory page 422 and PPU memory page 442. The CPU page table (PT) entry 412, CPU memory page 422, PPU page table (PT) entry 432, PPU memory page 442, and PSD state 452 function substantially the same as described in FIG. 4A, except as further described below. The series of memory page state transitions 402 is shown as time 407 progresses from time T=1 through time T=6.

The CPU page table entry 412 is updated to an invalid state, rather than a read-only state, at time T=3. The CPU memory page 422 remains active, because the PPU page table entry 432 maps to the CPU memory page 422 at time T=3. The CPU page table entry 412 remains in an invalid state at time T=4 and time T=5, while the CPU memory page 422 remains active during these times. At time T=5, the PPU page table entry 432 is updated to indicate that the PPU 202 has read/write access to the PPU memory page 442, rather than read-only access. The PSD state 452 corresponding to this condition is identified as copy complete, rather than read duplicate. At time T=6, the CPU memory page 422 is shown in a "don't care" (X) state to indicate that no memory page is mapped in system memory 104, and the CPU memory page 422 is now free to be allocated for some other purpose. All other states are as described above in conjunction with FIG. 4A.

Figure 4C:
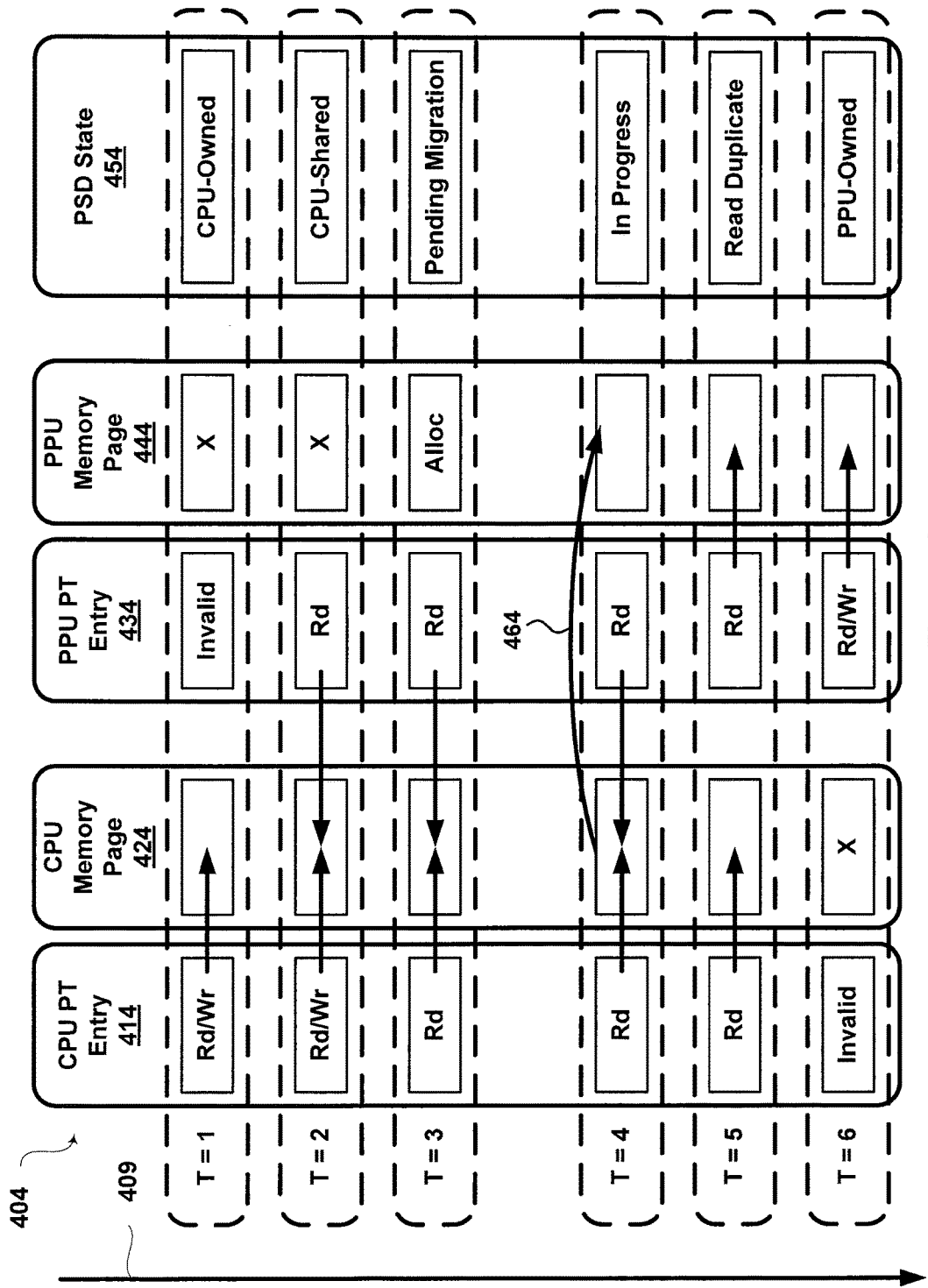
FIG. 4C illustrates a series of memory page states as a memory page migrates from system memory to PPU memory, according to yet another embodiment of the present invention.

FIG. 4C illustrates a series of memory page state transitions 404 as a memory page migrates from system memory 104 to PPU memory 204, according to one embodiment of the present invention. The series of memory page state transitions 404 corresponds to state transitions that occur when the PPU 202 generates a memory read operation directed to a CPU-owned memory page. As shown, the series of memory page state transitions 404 includes a CPU page table (PT) entry 414 and corresponding CPU memory page 424, a PPU page table (PT) entry 434 and corresponding PPU memory page 444, and a PSD state 454 for the corresponding CPU memory page 424 and PPU memory page 444. The CPU page table (PT) entry 414, CPU memory page 424, PPU page table (PT) entry 434, PPU memory page 444, and PSD state 454 function substantially the same as described in FIGS. 4A-4B, except as further described below. The series of memory page state transitions 404 is shown as time 409 progresses from time T=1 through time T=6.

The PPU 202 generates a memory read operation directed to a CPU-owned memory page, rather than a memory write operation, as described above. In such cases, the PPU page table entry 432 is updated to a read-only state, rather than a read/write state, at time T=2, and remains in a read-only state at time T=3. All other states are as described above in conjunction with FIGS. 4A-4B.

Figure 5A:
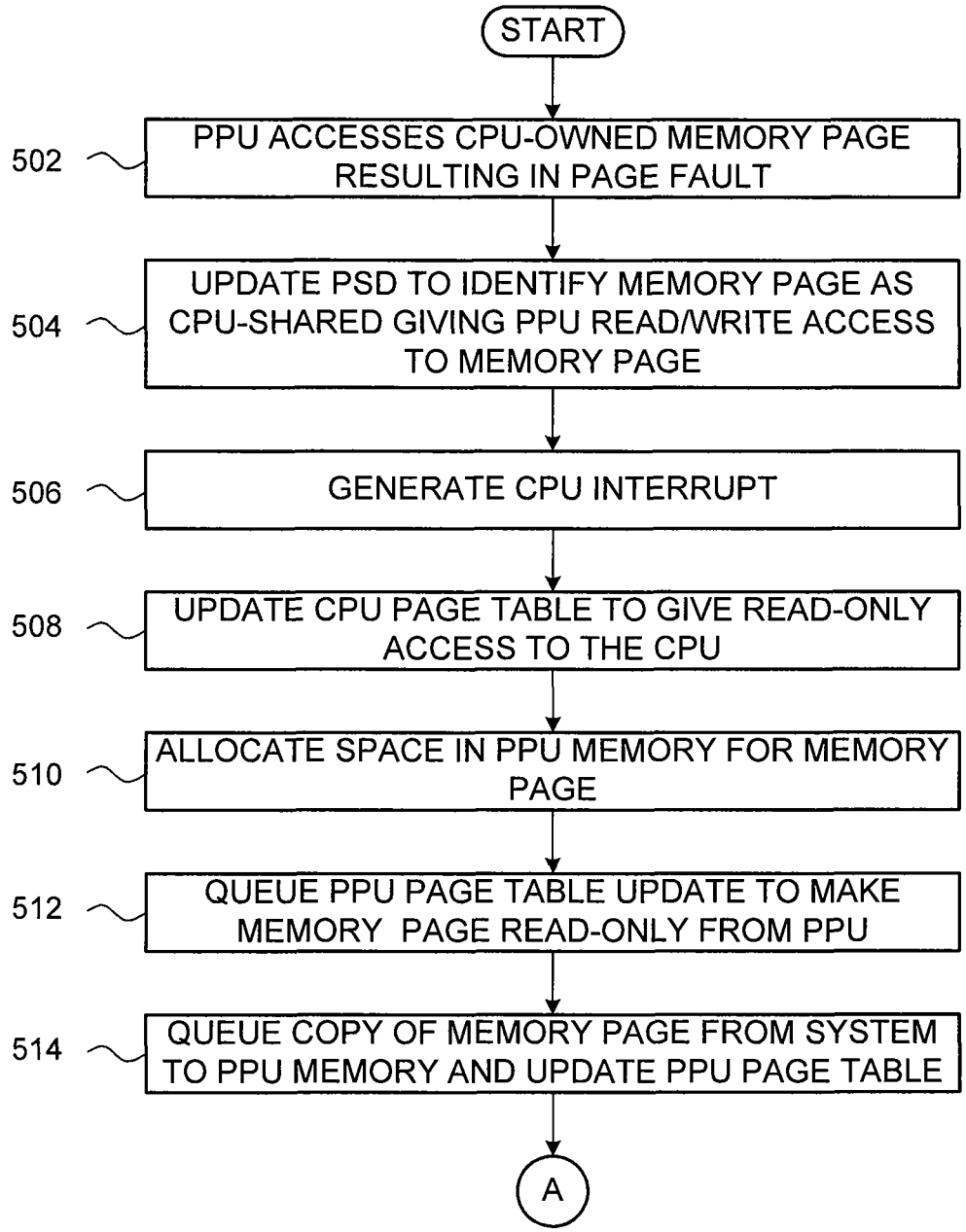
FIGS. 5A-5B set forth a flow diagram of method steps for migrating a memory page from system memory to PPU memory within a unified virtual memory architecture, according to one embodiment of the present invention.
Figure 5B:
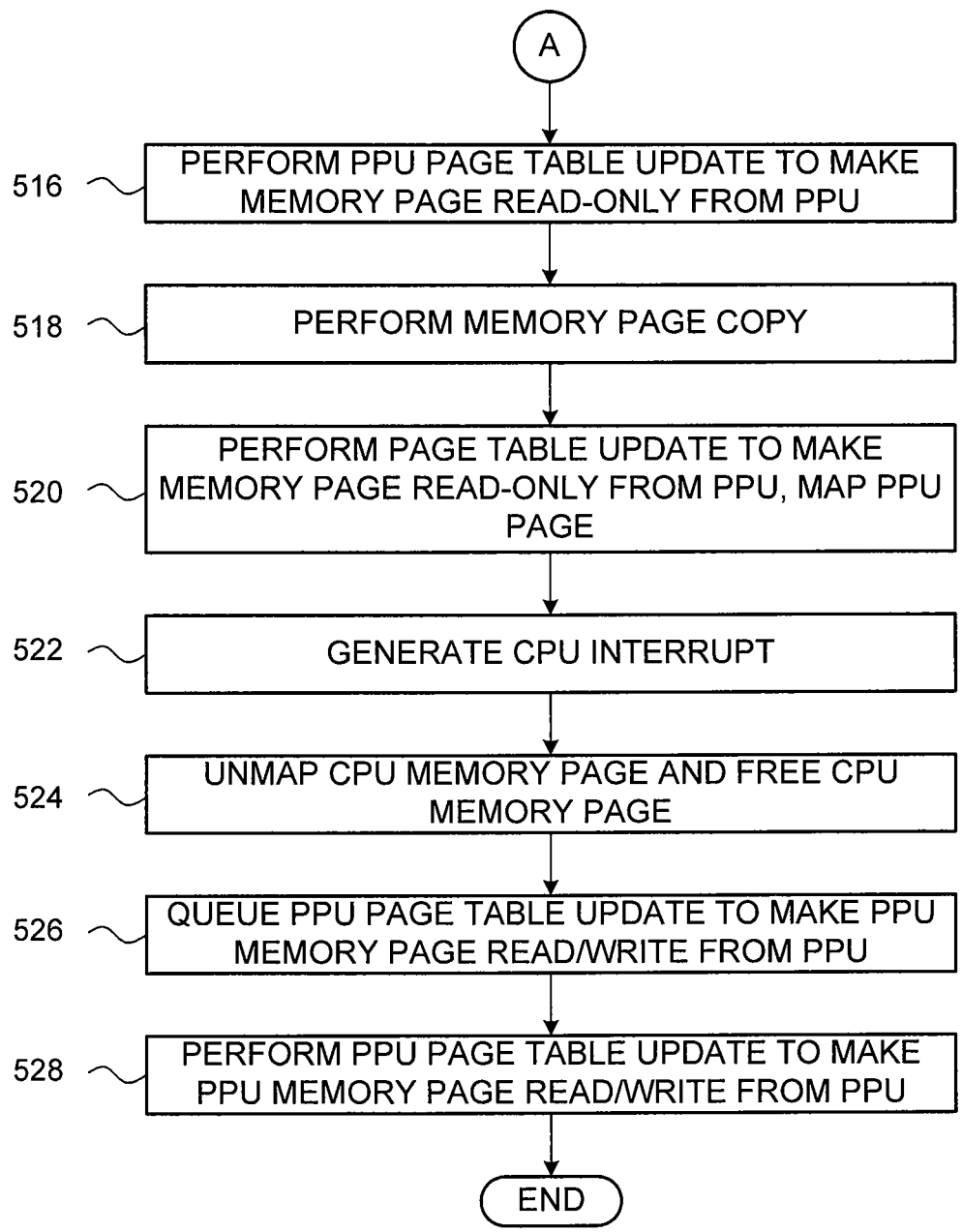

FIGS. 5A-5B set forth a flow diagram of method steps for migrating a memory page from system memory to PPU memory within a unified virtual memory architecture. Although the method steps are described in conjunction with the systems of FIGS. 1-4, persons of ordinary skill in the art will understand that any system configured to perform the method steps, in any order, is within the scope of the invention.

As shown, a method 500 begins at step 502, where the UVM driver 101 detects that the PPU 202 is accessing a CPU-owned memory page in system memory 104 resulting in a page fault. This step corresponds to the CPU-owned state at time T=1, as shown in FIG. 4A. At step 504, the UVM driver 101 updates the PSD entry for the accessed memory page to indicate that the memory page is a CPU-shared memory page. As a result, the PPU has read/write access privileges to the memory page. This step corresponds to the CPU-shared state at time T=2, as shown in FIG. 4A. At step 506, the UVM driver 101 causes a CPU interrupt. At step 508, the CPU page table is updated to give the CPU read-only access to the memory page. This step corresponds to the pending migration state at time T=3, as shown in FIG. 4A. At step 510, space is allocated in PPU memory 204 for the memory page. This step corresponds to the beginning of the in progress state at time T=4, as shown in FIG. 4A. At step 512, the UVM driver 101 queues a page table update to give the PPU 202 read-only access to the memory page. At step 514, the UVM driver 101 queues a memory page copy to copy the memory page from the system memory 104 to the PPU memory 204.

At step 516, the PPU page table is updated to give the PPU read-only access to the memory page. At step 518, the memory page is copied from system memory 104 to PPU memory 204. At step 520, the PPU page table is updated to give the PPU read-only access to the memory page. The PPU page table is also updated to map the memory page within the PPU memory 204. This step corresponds to the read duplicate state at time T=5, as shown in FIG. 4A. At step 522, the UVM driver 101 causes a CPU interrupt. At step 524, the memory page is unmapped in the CPU page table, and the memory page in the system memory 104 is identified as a free memory page. This step corresponds to the PPU-owned state at time T=6, as shown in FIG. 4A. At step 526, the UVM driver 101 queues a page table update to give the PPU 202 read/write access to the memory page in PPU memory 204. At step 528, the PPU page table is updated to give the PPU read/write access to the memory page in PPU memory. The method 500 then terminates.

In another embodiment, at step 508, the CPU page table entry 412 is updated to an invalid state, rather than a read-only state, as shown in FIG. 4B at time T=3. The CPU memory page 422 remains active, because the PPU page table entry 432 maps to the CPU memory page 422 at time T=3. The CPU page table entry 412 remains in an invalid state at steps 510-520, corresponding to time T=4 and time T=5, while the CPU memory page 422 remains active during these times. At step 520, the PPU page table entry 432 is updated to indicate that the PPU 202 has read/write access to the PPU memory page 442, rather than read-only access. The PSD state 452 corresponding to this condition is identified as copy complete, rather than read duplicate. All other states are as described above in conjunction with FIGS. 5A-5B.

In yet another embodiment, at step 502, the PPU 202 performs a read access to a CPU-owned memory page, resulting in a page fault. At step 504, the PPU page table entry 432 is updated to a read-only state, rather than a read/write state, as shown in FIG. 4C at time T=2, and remains in a read-only state at step 506, corresponding to time T=3. All other states are as described above in conjunction with FIGS. 5A-5B.

In sum, a central processing unit (CPU) and a parallel processing unit (PPU) access a shared memory that resides in a system memory within the memory space of the CPU. A memory page within the shared memory is initialized as a CPU-owned memory page, whereby only the CPU has access to the memory page. If the PPU generates a memory access operation directed to the CPU-owned memory page, then a page fault is generated. A page fault handler changes the state of the memory page from CPU-owned to CPU-shared, whereby both the CPU and the PPU have access to the memory page. The memory page is identified for later migration to a local memory in the PPU memory space. In some embodiments, the memory page is identified for later migration if the PPU accesses the memory page a threshold quantity of times or if the CPU does not access the memory page for a specified period of time. After the memory page has migrated from the shared memory to the local memory of the PPU, the state of the memory page is changed from CPU-shared to PPU-owned, whereby only the PPU has access to the memory page. If the CPU subsequently generates a memory access operation directed to the PPU-owned memory page, then a page fault is generated. The memory page then migrates back to the shared memory, and the state of the memory page is changed from PPU-owned to CPU-shared.

One advantage of the disclosed approach is that the PPU accesses memory pages with greater efficiency. Memory pages that are accessed only occasionally by the PPU or are accessed frequently by the CPU remain in system memory and are identified as CPU-shared. Memory pages that are accessed only frequently by the PPU and accessed infrequently by the CPU are migrated to PPU memory for more efficient access performance from the PPU.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for transitioning a memory page between memories in a virtual memory subsystem, the method comprising:
    detecting a first page fault in response to a first memory access request associated with a first memory page, wherein the first memory page resides at a first memory address in a system memory associated with a central processing unit (CPU), and a local page table does not include an entry corresponding to a virtual memory address included in the first memory access request; and
    in response to the first page fault, executing a page fault sequence that includes:
        modifying an ownership state of the first memory page to be a central-processing-unit-shared state, wherein, when in the central-processing-unit-shared state, both the CPU and a parallel processing unit (PPU) are able to access the first memory page at the first memory address in the system memory without experiencing a page fault; and
        scheduling the first memory page for migration from the system memory associated with the CPU to a local memory associated with the PPU based on a history of at least one of the PPU and the CPU accessing the first memory page.

2. The method of claim 1, further comprising:
    associating a first page table entry in a page table associated with the PPU with the first memory page;
    determining whether the first memory access request associated with the first page fault was a memory write operation; and
    if the first memory access request associated with the first page fault was a memory write operation, then setting an access characteristic in the first page table entry to read/write, or
    if the first memory access request associated with the first page fault was not a memory write operation, then setting an access characteristic in the first page table entry to read-only.

3. The method of claim 2, further comprising:
    setting an access characteristic in a second page table entry associated with the CPU to read-only; and
    modifying the ownership state of the first memory page to be pending-migration.

4. The method of claim 2, further comprising:
    setting an access characteristic in a second page table entry associated with the CPU to invalid; and
    modifying the ownership state of the first memory page to be pending-migration.

5. The method of claim 1, wherein executing the page fault sequence further comprises:
    determining that a use history associated with the first memory page indicates that the first memory page is likely to be accessed primarily by the PPU.

6. The method of claim 5, further comprising:
    updating a CPU page table to remove an entry corresponding to the virtual memory address and associating the virtual memory address with the first memory page; and
    causing the first memory page to be transmitted from the system memory to the local memory associated with the PPU.

7. The method of claim 5, further comprising:
    determining that a second memory page is scheduled for migration from the system memory to the local memory associated with the PPU; and
    causing the second memory page to migrate from the system memory to the local memory associated with the PPU in conjunction with causing the first memory page to migrate from the system memory to the local memory associated with the PPU.

8. The method of claim 7, wherein each memory page in the local memory associated with the PPU is larger than each memory page in the system memory, and wherein both the first memory page and the second memory page are to be combined to form at least a portion of the larger third memory page stored in the local memory associated with the PPU.

9. The method of claim 1, wherein executing the page fault sequence further comprises:
    determining that usage history for the first memory page indicates that the first memory page is likely to be accessed by both the PPU and the CPU;
    determining that a second memory page resides in the local memory associated with the PPU, wherein each memory page in the local memory associated with the PPU is larger than each memory page in the system memory, and wherein both the first memory page and a second memory page are associated with a first larger memory page; and
    deferring the migration of the first memory page from the system memory to the local memory associated with the PPU.

10. The method of claim 1, further comprising:
  migrating the first memory page from the system memory associated with the CPU to the local memory associated with the PPU; and
  modifying the ownership state of the first memory page to be a parallel-processing-unit-owned state.

11. The method of claim 1, further comprising modifying the ownership state of the first memory page to be the central-processing-unit-shared state based on a frequency of accesses of the first memory page by the PPU.

12. A non-transitory computer-readable storage medium including instructions that, when executed by a processing unit, cause the processing unit to perform an operation for transitioning a memory page between memories in a virtual memory subsystem, the operation comprising:
  detecting a first page fault in response to a first memory access request associated with a first memory page, wherein the first memory page resides at a first memory address in a system memory associated with a central processing unit (CPU), and a local page table does not include an entry corresponding to a virtual memory address included in the first memory access request; and
  in response to the first page fault, executing a page fault sequence that includes:
    modifying an ownership state of the first memory page to be a central-processing-unit-shared state, wherein, when in the central-processing-unit-shared state, both the CPU and a parallel processing unit (PPU) are able to access the first memory page at the first memory address in the system memory without experiencing a page fault; and
    scheduling the first memory page for migration from the system memory associated with the CPU to a local memory associated with the PPU based on a history of at least one of the PPU and the CPU accessing the first memory page.

13. The non-transitory computer-readable storage medium of claim 12, further comprising:
  associating a first page table entry in a page table associated with the PPU with the first memory page;
  determining whether the first memory access request associated with the first page fault was a memory write operation; and
  if the first memory access request associated with the first page fault was a memory write operation, then setting an access characteristic in the first page table entry to read/write, or
  if the first memory access request associated with the first page fault was not a memory write operation, then setting an access characteristic in the first page table entry to read-only.

14. The non-transitory computer-readable storage medium of claim 13, further comprising:
  setting an access characteristic in a second page table entry associated with the CPU to read-only; and
  modifying the ownership state of the first memory page to be pending-migration.

15. The non-transitory computer-readable storage medium of claim 13, further comprising:
  setting an access characteristic in a second page table entry associated with the CPU to invalid; and
  modifying the ownership state of the first memory page to be pending-migration.

16. The non-transitory computer-readable storage medium of claim 12, wherein executing the page fault sequence further comprises:
  determining that a use history associated with the first memory page indicates that the first memory page is likely to be accessed primarily by the PPU.

17. The non-transitory computer-readable storage medium of claim 16, further comprising:
  updating a CPU page table to remove an entry corresponding to the virtual memory address and associating the virtual memory address with the first memory page; and
  causing the first memory page to be transmitted from the system memory to the local memory associated with the PPU.

18. The non-transitory computer-readable storage medium of claim 16, further comprising:
  determining that a second memory page is scheduled for migration from the system memory to the local memory associated with the PPU; and
  causing the second memory page to migrate from the system memory to the local memory associated with the PPU in conjunction with causing the first memory page to migrate from the system memory to the local memory associated with the PPU.

19. The non-transitory computer-readable storage medium of claim 18, wherein each memory page in the local memory associated with the PPU is larger than each memory page in the system memory, and wherein both the first memory page and the second memory page are to be combined to form at least a portion of the larger third memory page stored in the local memory associated with the PPU.

20. The non-transitory computer-readable storage medium of claim 12, wherein executing the page fault sequence further comprises:
  determining that usage history for the first memory page indicates that the first memory page is likely to be accessed by both the PPU and the CPU;
  determining that a second memory page resides in the local memory associated with the PPU, wherein each memory page in the local memory associated with the PPU is larger than each memory page in the system memory, and wherein both the first memory page and a second memory page are associated with a first larger memory page; and
  deferring the migration of the first memory page from the system memory to the local memory associated with the PPU.

21. The non-transitory computer-readable storage medium of claim 12, wherein the history of at least one of the PPU and the CPU accessing the first memory page comprises at least one of a number of times the PPU accesses the first memory page, a number of times the CPU accesses the first memory page, a frequency at which the PPU accesses the first memory page, a frequency at which the CPU accesses the first memory page, a time associated with a most recent PPU access of the first memory page, and a time associated with a most recent CPU access of the first memory page.

22. The non-transitory computer-readable storage medium of claim 12, wherein modifying the ownership state of the first memory page comprises changing the ownership state from a central-processing-unit-owned state to the central-processing-unit-shared state.

23. The non-transitory computer-readable storage medium of claim 12, wherein the page fault occurs in response to the PPU performing the first memory access request associated with the first memory page.

24. The non-transitory computer-readable storage medium of claim 12, wherein executing the page fault sequence further comprises:
- determining that usage history for the first memory page indicates that the first memory page is likely to be accessed by both the PPU and the CPU; and
- in response, deferring the migration of the first memory page from the system memory to the local memory associated with the PPU.

25. The non-transitory computer-readable storage medium of claim 12, wherein scheduling the first memory page for migration from the system memory associated with the CPU to the local memory associated with the PPU comprises scheduling the first memory page to be moved from the first memory address in the system memory associated with the CPU to a second memory address in the local memory associated with the PPU.

26. A computing device, comprising:
- a first processing unit;
- a system memory containing instructions, that, when executed by the processing unit, cause the processing unit to:
  - detect a first page fault in response to a first memory access request associated with a first memory page, wherein the first memory page resides at a first memory address in a system memory associated with a central processing unit (CPU), and a local page table does not include an entry corresponding to a virtual memory address included in the first memory access request; and
  - in response to the first page fault, execute a page fault sequence that includes:
    - modifying an ownership state of the first memory page to be a central-processing-unit-shared state, wherein, when in the central-processing-unit-shared state, both the CPU and a parallel processing unit (PPU) are able to access the first memory page at the first memory address in the system memory without experiencing a page fault; and
    - scheduling the first memory page for migration from the system memory associated with the CPU to a local memory associated with the PPU based on a history of at least one of the PPU and the CPU accessing the first memory page.

27. The computing device of claim 26, wherein the system memory further contains instructions, that, when executed by the processing unit, cause the processing unit to:
- associate a first page table entry in a page table associated with the PPU with the first memory page;
- determine whether the first memory access request associated with the first page fault was a memory write operation; and
- if the first memory access request associated with the first page fault was a memory write operation, then set an access characteristic in the first page table entry to read/write, or
- if the first memory access request associated with the first page fault was not a memory write operation, then set an access characteristic in the first page table entry to read-only.

* * * * *